United States Patent [19]

Krause

[11] Patent Number: 4,669,712

[45] Date of Patent: Jun. 2, 1987

[54] HIGH PRESSURE CLAMPING DEVICE

[75] Inventor: Ludwig Krause, Waltenhofen, Fed. Rep. of Germany

[73] Assignee: Firma Saurer-Allma GmbH, Kempten, Fed. Rep. of Germany

[21] Appl. No.: 784,038

[22] Filed: Oct. 4, 1985

[30] Foreign Application Priority Data

Oct. 12, 1984 [DE] Fed. Rep. of Germany ....... 3437403

[51] Int. Cl.[4] ............ B23Q 3/08

[52] U.S. Cl. ............ 269/32

[58] Field of Search ............ 269/32; 192/94

[56] References Cited

U.S. PATENT DOCUMENTS 2,803,157 8/1957 Seitter ............ 269/32

*Primary Examiner*—Frederick R. Schmidt

*Assistant Examiner*—Judy J. Hartman

*Attorney, Agent, or Firm*—Holman & Stern

[57] ABSTRACT

A high pressure clamping device having a screw vice body, a fixed jaw arranged on one of the ends of the screw vice body, and a slide, which is retained in a guide on the screw vice body and carries a jaw movable relative to the fixed jaw. A reaction block is provided on the other end of the screw vice body to co-operate with a tensioning drive of the movable jaw, which drive consists of a force intensifier or slave unit and a threaded spindle, which can be driven by means of a common crank. The threaded spindle engages in a spindle nut of the slide. The movable jaw is positioned above the force intensifier in the retracted position of the slide and is arranged in the screw vice body between the reaction block and the threaded spindle. The spindle nut which is formed in an extension of the slide, exerts a forward twisting and downwardly directed tensioned pull on the movable jaw in its clamping position.

6 Claims, 3 Drawing Figures

HIGH PRESSURE CLAMPING DEVICE

BACKGROUND OF THE INVENTION

The invention relates to a high pressure clamping device, in other words, a machine vice having a force intensifier. The invention relates in particular to a high pressure clamping device with a vice body, a fixed jaw arranged at one end of the vice body, a slide which is retained in a guide on the vice body and carries a jaw movable relative to the fixed jaw, a thrust block on the other end of the vice body for a tensioning drive of the movable jaw, which consists of a force intensifier and a threaded spindle, which is operable by means of a common crank, by which the threaded spindle engages in a spindle nut of the slide.

A mechanical high pressure clamping device of the afore-mentioned type is well known. For this conventional type of high pressure clamping device the threaded spindle and the force intensifier are generally arranged above the vice body and approximately in the centre plane of the two jaws. When mention is made of the terms "above" or "below" or "top" or "bottom" in relation to said machine vice or high pressure clamping device in the preceding and subsequent text, it is on the basis that the high pressure clamping device rests on a level base. Naturally, it is a possible alternative to fix, for example, the high pressure clamping device of this type on a vertical base whereby the relative position of the individual parts correspondingly alter, without this having any affect upon the invention.

An arrangement of the threaded spindle and the intensifier unit lying in the plane of both jaws considerably increases the constructional length of such high presusre clamping devices. The total constructional length comprises the space required for the jaws, the slide, the threaded spindle, the force intensifier, the thrust block, the sleeve handle for operating the intensifier, plus a suitable crank. Thus, there is an unfavourable relationship between the available clamping distance and the total constructional length, and, in addition there are often problems regarding accommodating the high pressure clamping device in the machine tools in question. The space requirement necessary can only be reduced marginally by, for example, the crank being designed as a detachable item and by the slide carrying the movable jaw basically surrounding the threaded spindle, whereupon the slide must be relatively long in order to ensure positive guidance of this jaw.

Attempts have been maade to keep dimensions as small as possible even for the design of the force intensifier which may be regarded as a slave unit, whereby the slave unit can, for example, be used in accordance with West German patent specification No. 23 08 175 or alteratively a slave unit of another construction, for example, an hydraulically operated slave unit. But even these attempts have restrictions.

For machine vices not employing a slave unit it is known to utilise a so-called bottom tensioning construction, by which the threaded spindle is arranged beneath the clamping face of the vice body. Such a construction is described, for example, in West German patent specification No. 12 78 965. The threaded spindle has its thrust block in the region of the fixed jaw, and in the clamping operation the movable jaw is drawn against the fixed jaw. In utilising a slave unit there is the difficulty here in that in the clamping position the clamping force would have to be transmitted via the rotating threaded spindle, which seems not to be feasible. However, with this known construction there is the advantage that in the clamping operation the front end of the movable jaw is held down, by which a spreading out of the jaws, or an acute angle between the jaws is prevented.

BRIEF DESCRIPTION OF THE INVENTION

It is an object of the invention to further develop a high pressure clamping device of the construction described above which in retaining complete applicability of the construction using a slave unit, the relationship of the clamping distance in respect to the total length is considerably improved.

To this end, the invention proceeds from the high pressure clamping device of the type described in the preamble and proposes that the movable jaw in the retracted position of the slide is situated over the slave unit, which is arranged in the vice body between the thrust block and the threaded spindle and whereby the spindle nut which is located on a projection of the slide and because it is below the level of the movable jaw forwardly thereof; exercises a downwardly directed twisting force on the movable jaw in the clamped position.

By use of the arrangement in accordance with the invention, the threaded spindle, as known per se, is operated through the slave unit, the threaded spindle therefore has the task of moving the movable jaw far enough forwards on to the fixed jaw so that the workpiece is held by immense force. If this position is reached, the slave unit comes into operation, which then applies a clamping force which is transmitted without rotating the threaded spindle via the threaded spindle itself, used as a push rod. Since the threaded spindle and the slave unit is situated in a so-called low level tensioning set-up below the clamping zone, there is no excessively long design length, as the longitudinal dimensions of the individual components are not added on to each other.

Since, in particular, the transmission of forces of the threaded spindle is effected on to the spindle nut by means of a projection on the slide, the twisting moments acting on the movable jaw or the slide are reduced.

The invention also proposes that the slide is basically let into a longitudinal recess and that in this recess is arranged the guide of the slide on the vice body. This construction has the advantage that the threaded spindle and the guide only take up a limited spacial distance, thus ensuring that the twisting forces applied by the threaded spindle also remain limited. In particular, an extremely stable construction of the vice body is thus achieved. The invention further envisages that only the movable jaw assembled on the slide projects up above the vice body. Because of this, various jaws can readily be employed, by which both the clamping distance and the possibilities of adaption of the high pressure clamping device in accordance with the invention are considerably increased.

The slide preferably has a longitudinal bore in which the spindle nut is machined and which also surrounds the slave unit. It should be pointed out here that the spindle nut can be designed as an integral part of the slide, or as an inserted component. The arrangement chosen protects the spindle and the slave unit from external influences.

Since the longitudinal bore is relatively centrally arranged the moment of resistance and the moment of inertia is, as a result of this, only slightly reduced.

The invention proposes in particular, that the slave unit rotates together with the rotation of the threaded spindle, whereby a spring-loaded disengagement coupling is preferably provided between the threaded spindle and the slave unit, and during disengagement of the slave unit pushes forwards the threaded spindle with increased force under the influence of the crank.

The positive relative position of the movable jaw in respect to the vice body or the fixed jaw is improved when means for spring-loading are provided, which act upon the slide in the region of the threaded nut and press against the surface of the jaws. By this, the otherwise unavoidable play in the guides between the slide and the vice body is eliminated prior to the introduction of the clamping forces, so that the mutual alignment of the jaws under the clamping forces is maintained to a large degree.

BRIEF DESCRIPTION OF THE DRAWINGS

An embodiment of the invention is schematically illustrated in the drawings, in which.

DETAILED DESCRIPTION OF THE DRAWINGS

The vice body 1 has a generally square-shaped form. Recesses 4 are provided in the bearing surface 2 and in the faces 3, which accept fixing means for fixing the high pressure clamping device to the worktable of a machine tool.

Figure 1:
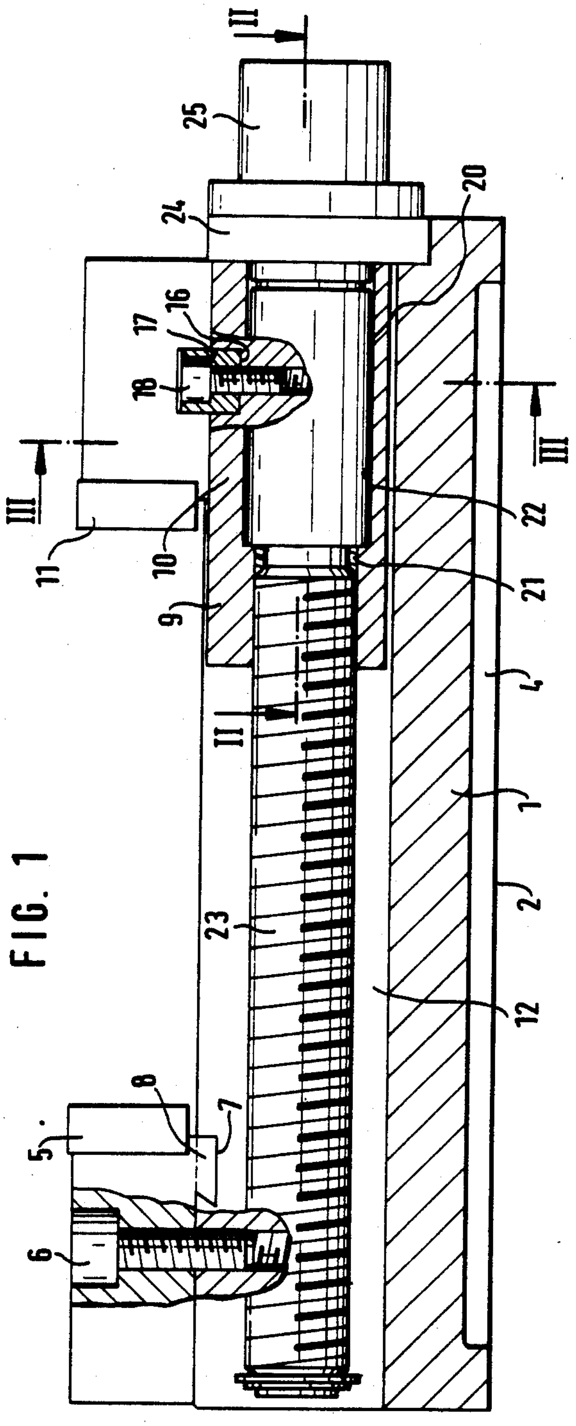
FIG. 1 shows a side view, in partial longitudinal section, through a high pressure clamping device in accordance with the invention.
Figure 2:
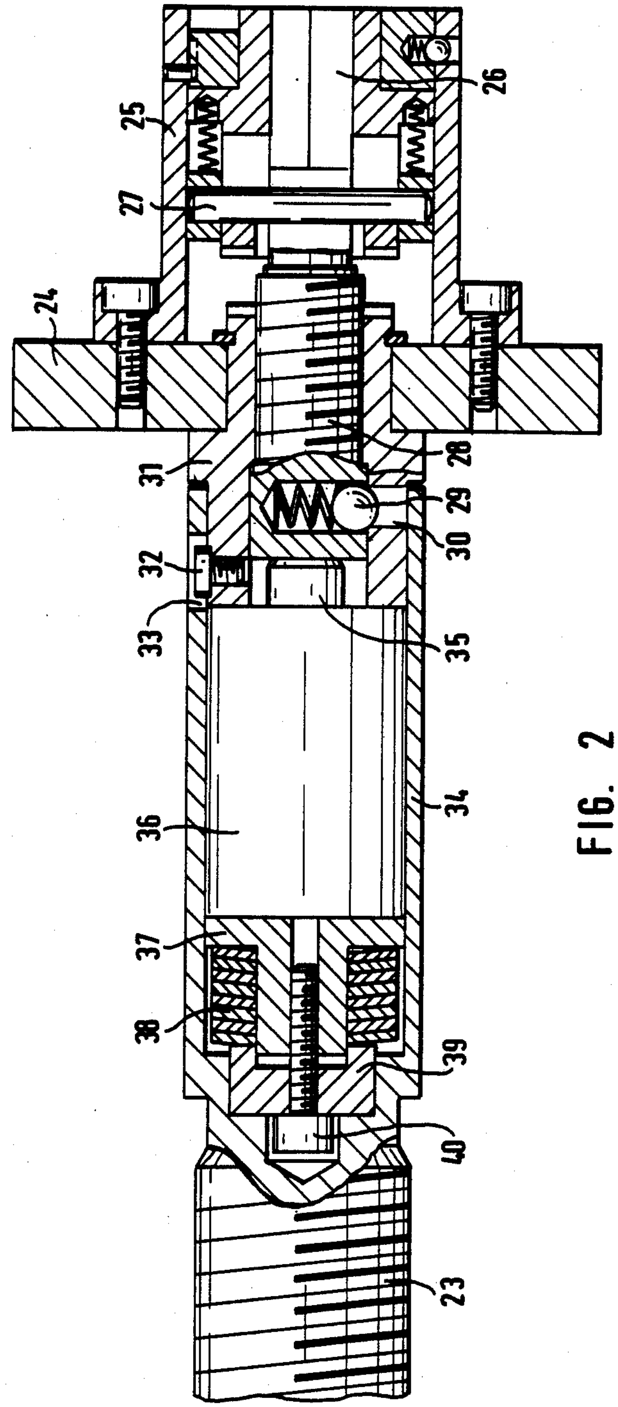
FIG. 2 shows on an enlarged scale, taken on the line II—II of FIG. 1, in which the slide and the vice body are omitted.
Figure 3:
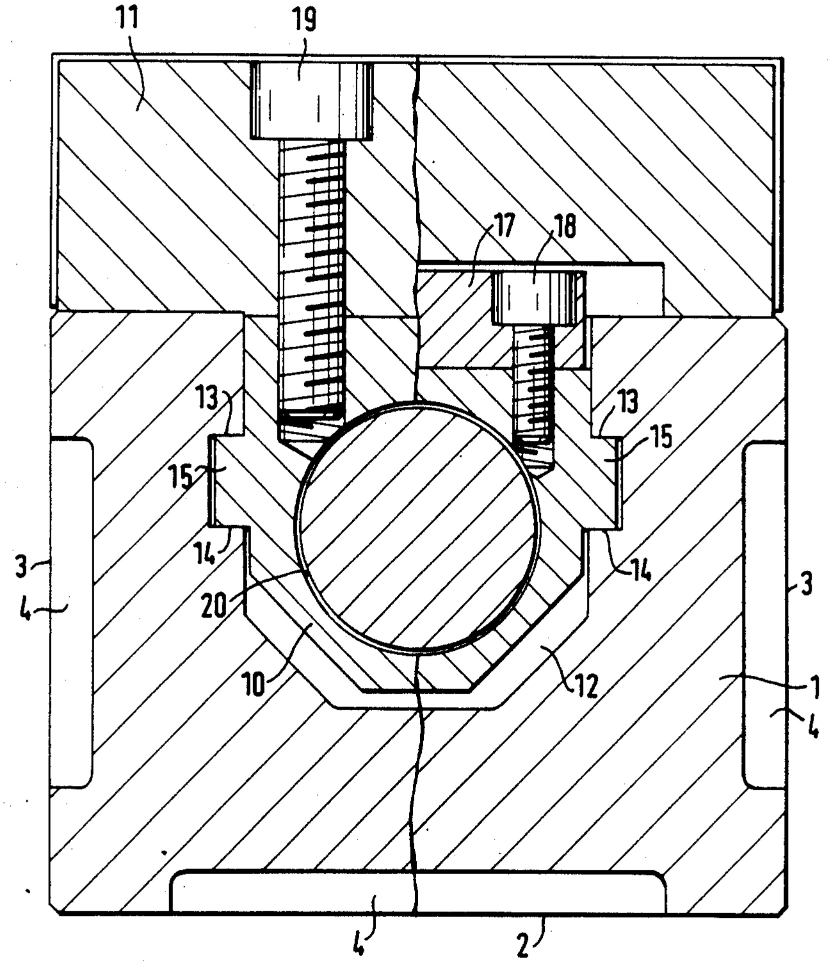
FIG. 3 shows a section taken on the section line III—III of FIG. 1 to the scale of FIG. 2.

One one end of the vice body 1 (on the left-hand end as shown in FIG. 1) is mounted a fixed jaw 5 retained by means of several screws 6. The fixed jaw 5 engages in an appropriately formed groove 7 in order to be able to withstand the clamping forces. At the same time, the V-shaped projection 8 of the fixed jaw 5 which engages the groove 7 only extends over the edge regions, whilst the intermediate region remains free in order to leave room for the projection 9 of the slide 10. The slide 10 is completely received, with the exception of the movable jaw 11, beneath the top edge of the vice body 1 in a longitudinal recess 12 of the vice body 1. Guides 12 and 14 are machined in the sides of this recess 12 in which the slide 10 engages with a tenon 15 in each case.

The slide carries a spring 17 in a transverse recess 16, which spring is retained by two screws 18. The spring 17 is used as a support element for the movable jaw 11, which in turn is secured by screws 19 to the slide.

The slide 10 has a longitudinal bore 20 which in the region of the boss 9 of the slide is provided with an internal thread, which serves as the spindle nut. The remaining part 22 of the longitudinal bore has a larger diameter and accepts the slave unit with the associated devices in the fully withdrawn position of the fixed jaw. In the forward position of the fixed jaw, the part 22 surrounds a more or less large area of the threaded spindle 23.

The thrust block 24 is fixed to the end of the vice body opposite the fixed jaw 5, on which block the threaded spindle and the slave unit is supported. A sleeve 25 is held against the thrust block 24, the sleeve surrounding a device for setting and limiting the clamping pressure, the details of which are of no interest in this context. The threaded pin 28 can turn by means of a crank (not shown) inserted into the opening 26 to engage a cross pin 27.

By means of a spring-loaded ball 29 which registers in the hole 30, in an intermediate sleeve 31, sleeve 31 also rotates under moderate resistance with the threaded pin 28, the intermediate sleeve turning a connecting sleeve 34 via the carrier screw 32, which is movable in a slot 33. The connecting sleeve 34 is designed integrally with the threaded spindle 23 and it is obvious that by means of the crank in the opening 26 the threaded spindle can be driven by this method, the spindle being supported against the thrust block 24 via the intermediate sleeve 31.

Since the threaded spindle moves the movable jaw via the slide, the resistance of feed of the threaded spindle 23 with a workpiece lying between the jaws increases when the jaws lie against the workpiece and the ball 29 is dislodged from the hole 30 when the resistance increases sufficiently to overcome the spring loading of the ball. Rotation takes place between the threaded pin 28 and the intermediate sleeve 31 and a pressure pin 35 is forced into the slave unit 36 indicated in schematic representation. A relatively large movement of the pressure element 37 which then corresponds to a large force pressing on the pressure piece 39 via a bevel dish spring assembly 38, the pressure spring being supported against the threaded spindle 23. A screw 40 holds the pressure piece 39 against the bevel dish spring assembly 38.

The high pressure which arises in the slave unit, exercises a sliding motion on the threaded spindle 23, which is transmitted by the threaded spindle on to the projection 9 of the slide 10 via the spindle nut 21.

Since this boss 9 is situated on the side of the movable jaw 11 facing the fixed jaw, a tensional force is produced which prevents or at least reduces twisting of the movable jaw 11 on applying clamping pressure.

If spring elements (not shown) are provided in the region of the projection 9, which press the projection 9 upwards in relation to the vice body the tenons 15 of the guide will always lie against the top guides 13, thus excluding twisting motions of the aforementioned nature.

I claim:

1. A high pressure clamping device comprising a screw vice body having first and second end portions, a fixed jaw arranged on the first end portion of the vice body, a slide having a projecting portion, a spindle nut provided on said projecting portion, a guide formed in the screw vice body and in which the slide is received, a further jaw movable relatively to the fixed jaw and mounted atop the slide, a thrust block provided on the second end portion of the screw vice body, a drive mechanism for the movable jaw, said drive mechanism comprising a force intensifier and a thread-carrying spindle extending from one end of the force intensifier, a crank device at an opposite end of the force intensifier for rotating the intensifier and the spindle, said spindle being received in said spindle nut of the slide, the movable jaw being positioned above the force intensifier when the slide is in a retracted position, the force intensifier being located in the screw vice body between the thrust block and the spindle and the spindle nut being positioned below and forwardly of the movable jaw for exerting a downwardly and forwardly directed force on the movable jaw in the clamping position.

2. A high pressure clamping device in accordance with claim 1, wherein the slide is received in a longitudinal recess of the screw vice body, the slide being provided with guides which are received in the recess.

3. A high pressure clamping device in accordance with claim 1 where the movable jaw projects above the screw vice body and the slide is received therewithin.

4. A high pressure clamping device in accordance with claim 1 wherein the slide has a longitudinal bore, in which is formed a spindle nut, said bore also enclosng the force intensifier.

5. A high pressure clamping device in accordance with claim 1, wherein the force intensifier turns with the rotation of the threaded spindle.

6. A high pressure clamping device in accordance with claim 1, wherein there is provided between the threaded spindle and the force intensifier a spring-loaded disengagement coupling which forwards the threaded spindle with increased force under the influence of the crank during disengagement of the force intensifier.

* * * * *